Nov. 1, 1955 — L. M. BLANCHETTE ET AL — 2,722,199
HYDRAULIC POWER BOOSTING MECHANISM
Filed June 29, 1954 — 3 Sheets-Sheet 3
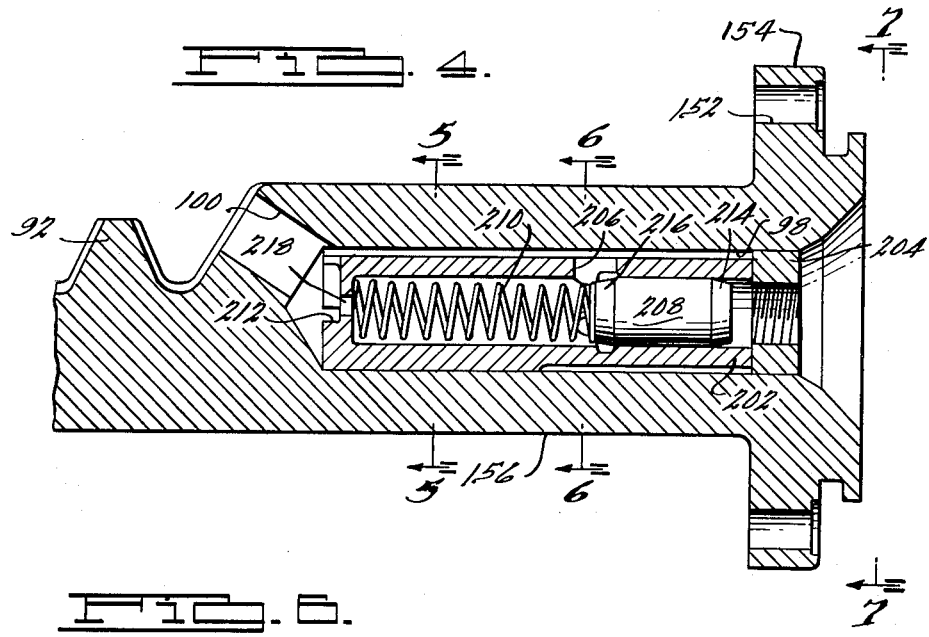
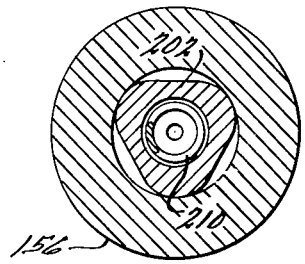
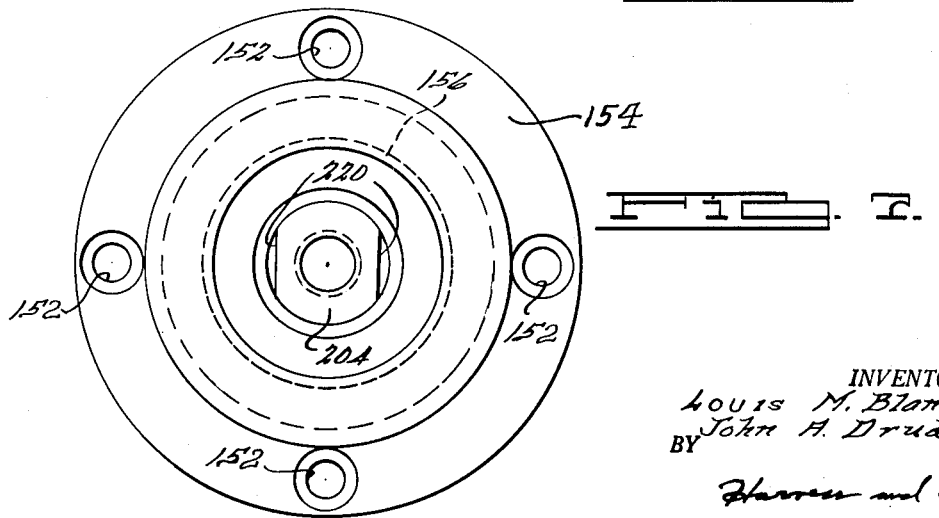
INVENTORS.
Louis M. Blanchette
John A. Drude
BY
Harness and Epstein
ATTORNEYS.

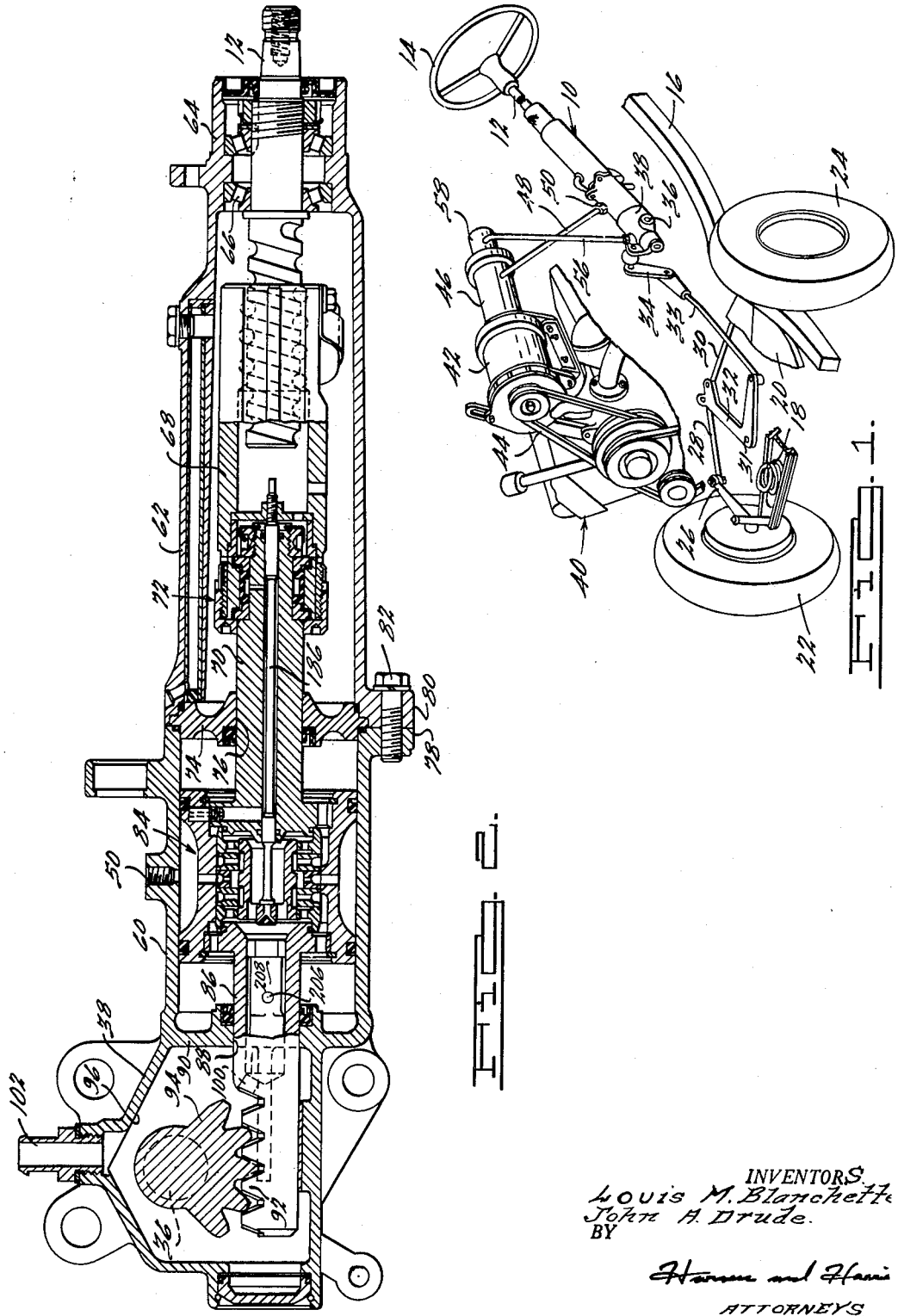

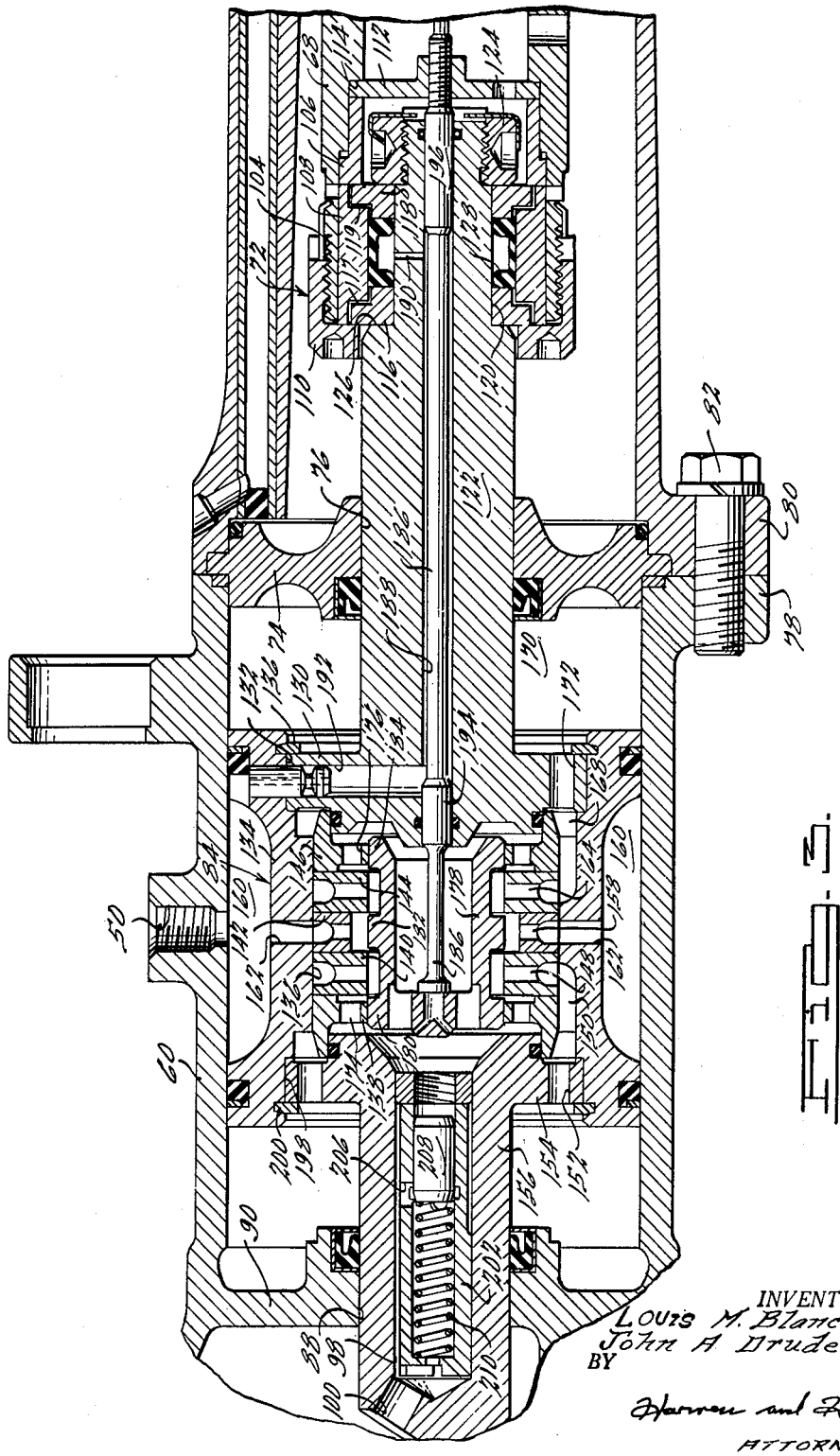

2,722,199
HYDRAULIC POWER BOOSTING MECHANISM

Louis M. Blanchette, Detroit, and John A. Drude, Royal Oak, Mich., assignors to Chrysler Corporation, Highland Park, Mich., a corporation of Delaware Application June 29, 1954, Serial No. 439,957

7 Claims. (Cl. 121—41)

Our present invention relates generally to hydraulic power boosting mechanisms and to a fluid pressure regulator valve means adapted to be used therewith for producing a back pressure in the downstream portion of a fluid circuit through which working fluid is distributed to various portions of the mechanism.

More particularly, our invention comprises a hydraulic power boosting mechanism incorporating a fluid pressure regulator valve means for regulating the magnitude of the back pressure within a fluid motor portion of the mechanism, said fluid motor portion being adapted to accommodate a continuous flow of working fluid from a fluid inlet passage means to an exhaust passage means. Our invention is particularly adapted to function as an automotive vehicle power steering mechanism although it is also capable of many other uses.

Our present invention comprises an improvement in the structure disclosed in the copending patent application of Alan G. Loofbourrow, Serial No. 391,209, which is assigned to the assignee of our instant invention, and reference may be had thereto, if desired, for the purpose of supplementing our instant disclosure. The subject matter of this copending application is related to an automotive vehicle power steering mechanism which includes a fluid motor concentrically disposed with respect to the vehicle steering wheel shaft. The fluid motor is comprised in part by a reciprocating piston which is operatively connected to the vehicle steering wheel shaft through a suitable threaded connection and a lost motion joint. A spool-type control valve element is disposed within the piston of the fluid motor and is positively connected to the steering shaft by means of a valve actuator rod.

The fluid motor of this power steering mechanism is adapted to accommodate a continuous circulation of fluid which flows from a fluid pressure source through the piston valve structure to an exhaust chamber. A hollow piston rod is secured to the piston assembly and is adapted to form a portion of an exhaust passageway communicating with the exhaust chamber. This piston rod is operatively connected to the vehicle steering linkage mechanism and is effective to transmit a steering effort thereto. Upon movement of the steering wheel shaft in either direction, the spool valve element is shifted thereby causing a pressure build-up within one working chamber on one side of the piston while simultaneously opening up the other working chamber on the other side of the piston to the exhaust passageway. The piston is actuated by virtue of this pressure build-up thereby producing a powered vehicle wheel steering effort.

It has been observed that a considerable amount of undesirable noise is produced by the working fluid as it circulates through the above-described valve mechanism during operation of the steering mechanism, especially during operation within a range of higher pressures. It is believed that this noise is caused by cavitation of the working fluid as it passes through the valve openings of the above-described valve mechanism, this cavitation being caused in part by the sudden change in fluid pressures which is produced due to the fluid restriction offered by the valve openings.

We have overcome the above-described difficulty by providing a valve means within the exhaust passageway leading to the aforementioned exhaust chamber, said valve means being effective to produce a substantial back pressure in the vicinity of the valve mechanism. This back pressure is of a sufficient magnitude to prevent cavitation from occurring and accordingly, the noise which has heretofore been produced by the circulating fluid has been eliminated.

The provision of an improved power steering mechanism incorporating a pressure regulator valve of the type described above being a principal object of our invention, another object is to provide a back pressure regulator valve which is adapted to be conveniently mounted in the fluid exhaust passage of a hydraulic power boosting mechanism as above described and which is substantially trouble-free during operation.

Another object of our invention is to provide a new and improved means for eliminating undesirable noise caused by circulating fluid within the control valve elements of a hydraulic power steering boosting mechanism wherein said means is simple in construction, is comprised of relatively few component elements, and is adapted to be conveniently installed in operative association with the components of the power boosting mechanism.

Another object of our present invention is to provide a back pressure regulator valve as set forth in the preceding objects which is adapted to subject the working fluid in the vicinity of the control valve elements to a back pressure greater than a predetermined minimum value throughout the entire operating range of the power boosting mechanism.

Another object of our present invention is to provide a back pressure regulator valve as set forth above which includes a movable control valve element for regulating the flow of working fluid to the exhaust chamber and which is further provided with a means for bypassing working fluid around the control valve element in the event of a failure in the operation of the latter.

Other objects will readily become apparent to persons skilled in the art as the description proceeds.

In carrying forth the foregoing objects, we have adapted the hollow piston rod of the aforementioned reciprocating piston to receive within the hollow interior thereof a hollow valve sleeve within which is slidably disposed a valve plunger element. The valve sleeve is provided with radial apertures at a point intermediate its axial ends and the plunger is adapted to progressively restrict these radial apertures when moved in one axial direction. We have provided a suitable spring means for normally biasing the plunger element in this axial direction.

The hollow interior of the valve sleeve is in fluid communication with the control valve chamber within the piston of the fluid motor and is adapted to function as a fluid exhaust passageway. The exhaust fluid acts upon the back pressure valve plunger in opposition to the force exerted by the plunger biasing spring and a back pressure build-up occurs by virtue of this opposing spring force.

As the back pressure valve plunger is displaced under the influence of this back pressure build-up, the radial apertures in the valve sleeve are progressively uncovered and the exhaust fluid is then exhausted therethrough to the surrounding hollow interior of the aforementioned piston rod and to the exhaust chamber. We have further provided the back pressure valve means with a suitable plunger dashpot means for damping any undesirable and uncontrolled oscillatory movement of the valve plunger.

A bypass passage is provided about the exterior of the valve sleeve for accommodating a limited flow of exhaust fluid. This bypass passage will continue to function in the event of a failure of the bypass valve mechanism thereby permitting a steering operation to take place.

Having thus briefly described certain of the general characteristics of the improved power steering mechanism of our instant invention, we will provide a more particular description of the same with reference to the accompanying drawings wherein:

Figure 1 is a schematic representation of our improved power steering mechanism in operative association with the steering linkage elements of a conventional automotive vehicle;

Figure 2 is a longitudinal cross sectional view of our improved power steering mechanism of the type which is generally shown in Figure 1;

Figure 3 is an enlarged view of a portion of the sectional view of Figure 2;

Figure 4 is an enlarged view of a portion of the structure shown in Figure 3. More particularly, it shows the physical arrangement of the back pressure regulator valve and a portion of the fluid motor piston rod;

Figure 5 is a cross sectional view of the structure of Figure 4 taken along the section line 5—5 of Figure 4;

Figure 6 is a cross sectional view of the structure of Figure 4 taken along the section line 6—6 of Figure 4; and Figure 7 is an end view of the structure of Figure 4 as viewed from the plane 7—7 of Figure 4.

Referring first to the assembly view of Figure 1, the improved power steering unit of the instant invention is generally designated by numeral 10. A manually actuated steering shaft, shown at 12, extends axially from the unit 10 and is rotatably journalled therein. A suitable steering wheel 14 may be operatively secured to the extended end of the shaft 12 for manually rotating the same.

The unit 10 may be secured to the vehicle frame in any suitable manner, a portion of the vehicle frame being shown at 16. The frame 16 may in turn be supported by a suitable suspension mechanism in any well known manner, portions of such a suspension mechanism being illustrated at 18 and 20.

A pair of vehicle road wheels is shown at 22 and 24, and suitable means may be provided for operatively joining these wheels to the aforementioned vehicle suspension mechanism. The axle for each wheel 22 and 24 is integrally joined to one of a pair of steering arms respectively associated therewith, one of the steering arms being shown at 26. Each of these steering arms is adapted to oscillate about individual king pins, one of which is shown at 27. The free oscillating end of each steering arm is operatively connected by means of suitable links 28 and 30, respectively, to one arm of a bellcrank member 32 which is pivoted at 31 to a fixed portion of the vehicle frame 16. The other end of the bellcrank member 32 is operatively connected by means of a link member 33 to a free end of a depending Pitman arm 34. Pitman arm 34 is journalled at one end to a rocker shaft 36 extending transversely through an end housing portion 38 of the power steering unit 10.

The assembly of Figure 1 further includes a power plant 49 which comprises a conventional generator 42 mounted thereon in a convenient position. The armature shaft of the generator 42 may be powered by the power plant 40 by means of a crank-shaft-driven belt drive 44.

A fluid pressure pump 46 may be positioned, as shown, upon the power plant 40 and may be powered by a suitable positive connection between the pump rotor and generator armature shaft. A high pressure fluid conduit 48 may extend from the discharge portion of the pump 46 to an intake fitting 50 for supplying the power steering unit 10 with pressurized working fluid to energize the latter in a manner which will hereinafter be set forth in particular detail.

A drain passage 56 may be provided, as shown, for conducting working fluid from an exhaust portion of the power steering unit 10 to the intake portion of the pump 46. A suitable filter unit 58 may be provided, if desired, in the low pressure return conduit 56.

As best seen in the sectional view of Figure 2, the power steering unit 10 comprises a lower housing portion 38, an intermediate housing portion 60, and an upper housing portion 62 in substantial coaxial alignment. The aforementioned steering shaft 12 is rotatably journalled within an upper axial end section 64 of the housing portion 62 by means of suitable bearings 66 and it extends axially within the interior of the housing portion 62. The lower extended end of the shaft 12 is threadably connected, as shown, to a reciprocating nut element 68 which in turn is operatively connected to an extended end of a piston rod 70 by a suitable lost motion connection 72.

A partition wall 74 extends transversely across the juxtaposed ends of the adjacent housing portions 60 and 62 and is centrally apertured at 76 to slidably receive the piston rod portion 70. The mating edges of the housing portions 60 and 62 may be flanged, as shown at 78 and 80, respectively, and secured together by suitable bolts 82.

A piston assembly 84 is slidably received within the housing portion 60 and is positively secured at one side thereof to the piston rod portion 70, as shown. A second piston rod portion 86 is positively secured to the opposite side of the piston structure 84 and is slidably received through an aperture 88 formed in an end wall structure 90. The extended end of the piston rod portion 86 is provided with rack teeth 92 which operatively engage a gear sector 94 rotatably mounted within the interior of the lower housing portion 38 upon rocker shaft 36 which was previously referred to in the description of the assembly of Figure 1.

The housing portion 38 defines an exhaust chamber 96 which communicates with a hollow interior 98 of the piston rod portion 86 through an exhaust port 100.

A fluid outlet fitting 102 is threadably secured to the housing portion 38 and it provides communication between the exhaust conduit 56 and the exhaust chamber 96.

As best seen in Figure 3, the nut portion 68 is externally threaded at one end thereof, as shown at 104, and is adapted to receive within its hollow interior a pair of circular spacer elements 106 and 108. A cap member 110 is threadably received on the end of the nut member 68 and is adapted to retain the spacer elements 106 and 108 in abutting relationship. A circular disc member 112 is retained in a transverse position within the interior of the nut member 68 by the spacer element 106 and by a circular shoulder portion 114 formed about the interior of the nut member 68.

A pair of circular lost motion elements 116 and 118 are received within the spacer element 108 and suitable lost motion gaps 117 and 119 are provided between adjacent portions of the spacer 108 and each of the lost motion elements 116 and 118, respectively. A reduced diameter end section 120 of a piston rod portion 122 is loosely received within aligned circular openings formed in the lost motion elements 116 and 118 and a suitable threaded retainer member 124 is secured to the terminal portion of the end section 120. The retainer member 124 is adapted to contact the lost motion element 118 and a shoulder 126 formed on the piston rod portion 122 is adapted to contact the other lost motion element 116. An annular space is defined about the reduced diameter end section 120 intermediate the lost motion elements 116 and 118 and a resilient seal element 128 is disposed therein as shown.

The piston rod portion 122 extends within the interior of the adjacent housing portion 60 and the terminal portion of this extended end is provided with an annular flange structure 130 which is adapted to be received within the mating circular recess 132 formed in the body portion 134 of the piston structure 84. A suitable snap ring device 136 may be provided, as shown, for retaining the flange structure 130 within its mating recess.

The piston body portion 134 is provided with a circular interior 136 which is adapted to retain a series of five circular valve elements shown at 138, 140, 142, 144, and 146 respectively. The valve element 138 is provided with radially extending passages 148 which communicates with one or more axially extending passages 150 formed in the piston body portion 134, as shown. The passages 150 extend through aligned passages 152 formed in a radial flange structure 154 which comprises a portion of a second piston rod portion 156 secured to the side of the piston structure 84 in juxtaposition with respect to the piston rod portion 122. This piston rod portion 156 will subsequently be described in detail.

The aforementioned valve element 142 is provided with radially extending passages 158 which communicate with an annular space 160 formed about the outer periphery of the piston body portion 134 of the piston structure 84 through one or more passages 162. The valve element 144 is provided with radially extending passages 164 which communicate with one or more axially extending passages 168 formed in the piston body portion 134. The passages 168 communicate with the working chamber 170 disposed on one side of the piston structure 84 through aligned passages 172 formed in the piston rod flange structure 130. Axial passages 174 and 176 are formed in the remaining valve elements 138 and 146, respectively.

A spool-type valve element 178 is slidably received within coaxially disposed central openings formed in the aforementioned valve element and is provided with three axially spaced peripheral valve lands 180, 182 and 184. The spool-type valve element 178 is secured to one end of the valve actuator rod 186 which is adapted to extend axially through a central opening 188 formed in the piston rod portion 122. The other end of the valve actuator rod 186 is threadably secured to the disc element 112 in the lost motion structure 72. The central opening 188 further serves to function as a fluid passage which communicates at one end thereof with the annular space between the lost motion elements 116 and 118 through a radial passage 190. The passage 188 communicates at the other end thereof with the annular space 160 through radial passage means 192, a portion of this passage means 192 being formed in the radial flange structure 130 of the piston rod portion 122. Large diameter portions 194 and 196 are provided on the valve actuator rod 186 at either end of the passage 188 and suitable fluid sealing means may be provided about these large diameter portions to prevent fluid leakage from the interior of the passage 188.

Referring again to the piston rod portion 156, the associated radial flange portion 154 is retained within a mating recess 198 formed in the end of the piston body portion 134 by suitable retainer means 200. This radial flange structure is effective to maintain the valve elements 138, 140, 144, and 146 in axially stacked relationship within the interior opening 136 of the piston body portion 134.

As best seen in Figures 3 and 4, the axially extending interior opening 98 is adapted to receive a hollow valve sleeve element 202 which may be retained therein by a centrally apertured plug 204 press-fitted or otherwise secured within the opening 98 of the piston rod portion 156.

As best seen in Figures 4, 5 and 6, one portion of the valve sleeve 202 has a generally triangular configuration having rounded axially extending edges which engage the internal cylindrical wall of the piston rod portion 156. The remaining portion of the sleeve 202 is substantially cylindrical in shape and is spaced radially from the inner wall of the interior 98 of the piston rod portion 156.

A plurality of openings 206 extend from the hollow interior of the valve sleeve 202 to the space defined by the cylindrical walls of the hollow interior of the piston rod portion 98 and the outer surface of the valve sleeve 202. This space is in fluid communication with the exhaust port 100 which extends to the exhaust chamber 96 within the lower housing portion 38, as previously described.

The hollow interior of the valve sleeve 202 is substantially cylindrical in shape and is adapted to slidably receive a cylindrical valve plunger element 208 as shown. A spring 210 may be interposed between the valve plunger element 208 and an end of wall 212 formed on the valve sleeve 202 for biasing the plunger element 208 in the right hand direction, as viewed in each of Figures 3 and 4. The corners of the plunger element 208 may be chamfered as shown at 214 and 216. By preference, the free length of the spring 210 is such that the plunger will not be caused to contact the plug 204.

The wall 212 is provided with a restricting orifice 218 for the purpose of providing a dashpot effect as the plunger 208 moves axially within the hollow interior of valve sleeve 202 thereby damping undesirable and uncontrolled oscillations of the plunger 208 during the operation of the unit.

In the operation of the above-described mechanism, the vehicle operator may control the directional variation of the vehicle road wheels 22 and 24 by applying a steering effort to the steering wheel 14 which in turn causes the shaft 12 to rotate in either direction as desired.

As best seen in Figure 7, the plug 204 is formed with a pair of flats 220 for providing fluid communication between the interior of the central valve assembly and the fluid passage formed between the sleeve 202 and the piston rod portion 156. This additional fluid exhaust passage serves as a bypass passage and is effective to permit a steering operation to take place in the event that the valve plunger 208 fails for some reason to open the ports 206.

The rotary motion of the shaft 12 imparts a longitudinal movement to the nut member 88 by virtue of the threaded connection therewith. The movement of the nut member 68 is accompanied by a corresponding movement of the spool-type valve element 178 by virtue of the positive connection provided by the valve actuator rod 186 between the nut member 68 and the valve element 178.

As the nut member 68 is moved to the right, as viewed in Figure 3, the lost motion gap 119 is reduced and upon movement of the nut member 68 to the left, the lost motion gap 117 becomes reduced.

As viewed in Figures 2 and 3, the spool valve element is in the neutral or balanced position and both of the lost motion elements 116 and 118 are shown seated against the shoulder 116 and against the retainer member 124, respectively. When the valve is in this position, the working fluid supplied by the pump 46 through the supply conduit 56 enters the annular space 160 and circulates through the piston passage 162. The fluid then passes through valve element 142 and a portion of the same then passes through the annular space between the valve land 182 and valve element 144, then past valve land 184 and valve element 146, and finally into the interior of the valve element 178 which is in fluid communication with the fluid exhaust passage means. The remaining portion of the fluid passes through the annular space between valve land 182 and valve element 140, then past valve land 180 and valve element 138, and finally into the interior of valve element 178. The exhaust fluid within the interior of the valve element 178 acts against the plunger 208 and shifts the same against the force exerted by spring 210 until the valve ports 206 are opened. The fluid is then exhausted through the interior of valve sleeve 202, through valve ports 206, through the interior 98 of the piston rod portion 156, through the exhaust port 100 and finally into the exhaust chamber 96. Because of the restriction provided by the plunger 208, a back pressure build-up occurs within the portion of the exhaust passage means which is partly defined by the interior of the valve element 178.

If it is assumed that the spool valve element 178 is moved to the right, as viewed in Figure 1, with respect to the valve elements 138, 140, 142, 144, and 146, then the flow past the valve land 180 is restricted and the annular space between the valve land 182 and the valve element 140 is increased, the annular space between valve land 182 and valve element 144 being simultaneously decreased. A pressure build-up will therefore occur in passages 148, 150, and 152 and in the working chamber at the left of the piston assembly 84. Upon movement of the piston assembly to the right under the influence of the pressure build-up, fluid from the opposing working chamber at the right of the piston chamber is exhausted through passages 182, 168, and 164, through the annular space between valve land 184 and valve element 144 and then into the exhaust passage means.

It is apparent that a similar pressure build-up will occur in the working chamber at the right of the piston assembly when the valve element 178 is moved in the opposite direction.

The chamfered portion of the valve plunger element 208 is effective to provide a gradual restriction of the valve port 206 and to prevent sudden fluctuations in the magnitude of the back pressure. By preference, both ends of the plunger are chamfered to provide for reversibility and to facilitate assembly.

Because the valve plunger is free floating and since contact between the plunger 208 and the plug 204 is prevented, the back pressure valve assembly is silent in operation.

The magnitude of the back pressure may be readily varied as desired by using plunger springs having various spring rates.

Although one embodiment of our instant invention has been specifically disclosed, we contemplate that many modifications thereof may be made without departing from the scope of the invention.

What we claim and desire to secure by United States Letters Patent is:

1. In a power steering mechanism for use in combination with the steering linkage mechanism of an automotive vehicle, a power cylinder, a piston assembly operatively disposed in said cylinder, a source of working fluid pressure, passage means for transferring said fluid pressure to said mechanism, and a control valve assembly disposed at least in part in said passage means for controlling the distribution of said working fluid pressures in said mechanism for actuating the same, said piston assembly including a hollow piston rod extending to the exterior of said cylinder; a pressure regulator valve means disposed in said hollow piston rod for producing a pressure buildup in the vicinity of said control valve assembly, said hollow piston rod partly defining an exhaust passage means for accommodating the flow of said working fluid from said mechanism, said pressure regulator valve means including a hollow valve sleeve, a valve port formed in said sleeve for providing communication between the interior of said hollow piston rod and the interior of said sleeve, a movable valve plunger disposed within said sleeve and adapted to progressively restrict said valve port upon movement thereof in one direction, and spring means for biasing said plunger in said one direction, the exhausted working fluid pressure being effective to move said plunger against an opposing force exerted by said spring means to partially open said exhaust port.

2. In a power steering mechanism for use in combination with the steering linkage mechanism of an automotive vehicle, a power cylinder, a piston assembly operatively disposed in said cylinder, a source of working fluid pressure, passage means for transferring said fluid pressure to said mechanism, and a control valve assembly disposed at least in part in said passage means for controlling the distribution of said working fluid pressures in said mechanism for actuating the same, said piston assembly including a hollow piston rod extending to the exterior of said cylinder; a pressure regulator valve means disposed in said hollow piston rod for producing a pressure buildup in the vicinity of said control valve assembly, said hollow piston rod partly defining an exhaust passage means for accommodating the flow of said working fluid from said mechanism, said pressure regulator valve means including a hollow valve sleeve, a valve port formed in said sleeve for providing communication between the interior of said hollow piston rod and the interior of said sleeve, a movable valve plunger disposed within said sleeve and adapted to progressively restrict said valve port upon movement thereof in one direction, spring means for biasing said plunger in said one direction, said working fluid being effective to move said plunger against an opposing force exerted by said spring means to partially open said exhaust port, and dashpot means for damping the movement of said valve plunger thereby preventing uncontrolled oscillation of said plunger.

3. The combination as set forth in claim 1 wherein said hollow valve sleeve includes one closed end, said sleeve, said plunger and said closed end defining a dashpot chamber, and a fluid restricting orifice formed in said closed end for producing restricted fluid communication between said dashpot chamber and the interior of said piston rod.

4. The combination as set forth in claim 3 wherein said valve plunger is provided with a tapered portion to provide a controlled restriction of said port and to prevent rapid fluctuations in said exhausted working fluid pressure.

5. In a power boosting mechanism comprising a fluid motor with a pair of opposed working chambers, pressure passage means for supplying working fluid under pressure to said working chambers and exhaust passage means for exhausting fluid from said working chambers; a pressure regulator valve means disposed in said exhaust passage means including a hollow valve sleeve, a valve port formed in said sleeve, a movable valve plunger slidably disposed within said sleeve, said valve plunger being adapted to progressively restrict said valve port upon movement thereof in one direction, and spring means for biasing said plunger in said one direction, said port forming a portion of said exhaust passage means and the pressure of the exhaust fluid in said exhaust passage means being effective to urge said plunger against said spring means in the opposite direction.

6. In a power boosting mechanism comprising a fluid motor with a pair of opposed working chambers, pressure passage means for supplying working fluid under pressure to said working chambers and exhaust passage means for exhausting fluid from said working chambers, said exhaust passage means including a hollow conduit portion; a pressure regulator valve means disposed in said conduit portion including a hollow valve sleeve, a space formed between the outer surface of said valve sleeve and the inner wall of said hollow conduit portion, a valve port formed in said sleeve providing communication between said space and the interior of said sleeve, a movable valve plunger slidably disposed within said valve sleeve, said valve plunger being adapted to progressively restrict said valve port upon movement thereof in one direction, spring means for biasing said plunger in said one direction, said port and said space forming a portion of said exhaust passage means, a spring seat formed near one end of said sleeve, and a spring disposed internally of said sleeve between said seat and said plunger for biasing the latter in said one direction, the pressure of the exhaust fluid in said exhaust passage means being effective to urge said plunger against said spring in the opposite direction, said plunger being tapered to provide a gradual variation in the degree of restriction of said port upon movement of said plunger.

7. In a power boosting mechanism comprising a fluid motor with a pair of opposed working chambers, pressure passage means for supplying working fluid under pressure to said working chambers and exhaust passage means for exhausting fluid from said working chambers, said exhaust passage means including a hollow conduit portion; a pressure regulator valve means disposed in said conduit portion including a hollow valve sleeve, a space formed between the outer surface of said valve sleeve and the inner wall of said hollow conduit portion, a valve port formed in said sleeve providing communication between said space and the interior of said sleeve, a movable valve plunger slidably disposed within said valve sleeve, said valve plunger being adapted to progressively restrict said valve port upon movement thereof in one direction, spring means for biasing said plunger in said one direction, said port and said space forming a portion of said exhaust passage means, a spring seat formed near one end of said sleeve, a spring disposed internally of said sleeve between said seat and said plunger for biasing the latter in said one direction, the pressure of the exhaust fluid in said exhaust passage means being effective to urge said plunger against said spring in the opposite direction, and a flow restricting orifice formed in said sleeve in the vicinity of said one end thereof, said orifice and said sleeve defining a dashpot means for damping the movement of said plunger.

References Cited in the file of this patent

UNITED STATES PATENTS

| 913,853 | Rowntree | Mar. 2, 1909 |
| 1,790,620 | Davis | Jan. 27, 1931 |
| 1,959,177 | Sassen | May 15, 1934 |
| 2,384,962 | Pohl | Sept. 18, 1945 |
| 2,395,671 | Kleinhans | Feb. 26, 1946 |

FOREIGN PATENTS

| 694,840 | Great Britain | July 29, 1953 |